(12) United States Patent
Huang et al.

(10) Patent No.: US 9,564,815 B2
(45) Date of Patent: Feb. 7, 2017

(54) FLYBACK POWER CONVERTER, SECONDARY SIDE CONTROL CIRCUIT, AND CONTROL METHOD THEREOF

(71) Applicant: RICHTEK TECHNOLOGY CORPORATION, Zhubei, HsinChu (TW)

(72) Inventors: Chun-Shih Huang, Taipei (TW); Chang-Yu Wu, Zhubei (TW); Pei-Yuan Chen, Zhubei (TW)

(73) Assignee: RICHTEK TECHNOLOGY CORPORATION, Zhubei, Hsinchu (TW)

( * ) Notice: Subject to any disclaimer, the term of this patent is extended or adjusted under 35 U.S.C. 154(b) by 0 days.

(21) Appl. No.: 14/943,662

(22) Filed: Nov. 17, 2015

(65) Prior Publication Data
US 2016/0141966 A1    May 19, 2016

Related U.S. Application Data

(60) Provisional application No. 62/081,194, filed on Nov. 18, 2014.

(51) Int. Cl.
*H02M 3/335* (2006.01)
*H02M 1/00* (2006.01)
*H02M 1/42* (2007.01)

(52) U.S. Cl.
CPC ....... *H02M 3/33523* (2013.01); *H02M 1/4258* (2013.01); *H02M 2001/0009* (2013.01); *H02M 2001/0025* (2013.01); *H02M 2001/0032* (2013.01)

(58) Field of Classification Search
CPC .................................................. H02M 3/33523
See application file for complete search history.

(56) References Cited

U.S. PATENT DOCUMENTS 6,009,000 A * 12/1999 Siri .......................... H02J 1/102
363/21.09

* cited by examiner

*Primary Examiner* — Emily P Pham
(74) *Attorney, Agent, or Firm* — Tung & Associates

(57) ABSTRACT

The present invention provides a flyback power converter, a secondary side control circuit, and a control method thereof. The flyback power converter converts an input voltage to an output voltage, and provides a load current to a load circuit. The flyback power converter includes: a transformer circuit, a power switch circuit, a switch current sense circuit, a primary side control circuit, and a secondary side control circuit. The secondary side control circuit adaptively adjusts a frequency of a zero of a compensator gain function and/or a mid-frequency gain of the compensator gain function according to the load current, such that a number of poles of a system open loop gain function of the flyback power converter is at most more than a number of zeroes of the system open loop gain function by one under a crossover frequency.

28 Claims, 8 Drawing Sheets

FLYBACK POWER CONVERTER, SECONDARY SIDE CONTROL CIRCUIT, AND CONTROL METHOD THEREOF

CROSS REFERENCE

The present invention claims priority to U.S. 62/081,194, filed on Nov. 18, 2014.

BACKGROUND OF THE INVENTION

Field of Invention

The present invention relates to a flyback power converter, a secondary side control circuit, and a control method thereof; particularly, it relates to such flyback power converter which adaptively adjusts a frequency of a zero of a compensator gain function and/or a mid-frequency gain of the compensator gain function according to a load current, and a secondary side control circuit and a control method thereof.

Description of Related Art

In applications of a power converter for providing power to a motor or a light emitting device (LED) circuit, a two-stage power converter is often required in order to achieve power factor correction (PFC) and to provide an adjustable output voltage (e.g., switchable between different levels such as 5V, 12V, and 24V etc.). For example, as shown in FIG. 1A, an AC power supply 30 generates an AC voltage Vac. The power converter 100 includes a first stage PFC circuit 10 and a second stage DC-DC conversion circuit 20. The first stage PFC circuit 10 converts the AC voltage Vac to a DC output voltage Vout. The second stage DC-DC conversion circuit 20 converts the output voltage Vout to a load current Iload which is provided to the load circuit 40, wherein the load circuit 40 is for example a motor or a light emitting device circuit. The first stage PFC circuit 10 is often embodied by an isolated circuit, in order to isolate the output voltage Vout and the AC voltage Vac. The second stage DC-DC conversion circuit 20 may be embodied by a switching regulator or a linear regulator, and if desired, a dimmer function of the light emitting device circuit may be provided in the second stage DC-DC conversion circuit 20.

As one example, the power converter 100 shown in FIG. 1A can be an isolated LED driver circuit with a dimmer function, wherein the first stage PFC circuit 10 operates in a discontinuous conduction mode (DCM) to achieve high PFC and to isolate the LEDs from the AC power. The second stage DC-DC conversion circuit 20 regulates the load current Iload by a linear regulator, for adjusting the brightness of the LEDs.

In the aforementioned power converter 100, typically, the control system of the power converter 100 is compensated by fixed parameters which are designed for heavy load condition. In this case, when the load current Iload is low, i.e., when the load circuit 40 is in light load condition, an unstable situation of a control system may occur because the compensation is improper. FIG. 1B is a schematic diagram showing signal waveforms of the output voltage Vout and the load current Iload in the unstable situation. As shown in FIG. 1B, when the load circuit 40 is in light load condition, the output voltage Vout and the load current Iload will be conductive intermittently, which will cause flickers of the LEDs that is undesirable.

In view of the above, the present invention proposes a flyback power converter, a secondary side control circuit, and a control method thereof, which solve the light load unstable problem. For example, when the present invention is applied to driving LEDs, the brightness of the LEDs can be maintained stable without flickering even in the light load condition.

SUMMARY OF THE INVENTION

From one perspective, the present invention provides a flyback power converter, for converting an input voltage to an output voltage, and providing a load current to a load circuit, the flyback power converter comprising: a transformer circuit, which includes: a primary winding, for receiving the input voltage; a secondary winding, for generating the output voltage at an output node; and a tertiary winding, for generating a voltage sense signal according to the output voltage; a power switch circuit, which is coupled to the primary winding, for operating a power switch therein according to an operation signal, so as to convert the input voltage to the output voltage; a switch current sense circuit, which is coupled to the power switch circuit, for generating a switch current sense signal according to a switch current flowing through the power switch; a primary side control circuit, which is coupled to the tertiary winding, the switch current sense circuit, and the power switch circuit, for generating the operation signal according to the voltage sense signal, the switch current sense signal, and a feedback signal; and a secondary side control circuit, which is coupled to the output node and the primary side circuit, for generating the feedback signal according to the load current, and adaptively adjusting a frequency of a zero of a compensator gain function and/or a mid-frequency gain of the compensator gain function according to a condition of the load current, such that a number of poles of a system open loop gain function of the flyback power converter is at most more than a number of zeroes of the system open loop gain function by one under a crossover frequency.

In one preferable embodiment, the flyback power converter further comprises an opto-coupler circuit, which is coupled between the primary side circuit and the secondary side circuit, for generating an opto-coupler signal which is inputted to the primary side control circuit according to the feedback signal.

In one preferable embodiment, the secondary side control circuit includes: a current regulator coupled to the load circuit, for regulating the load current; a load current sense circuit, which is coupled to the current regulator, for sensing the load current and generating a load current sense signal according to the load current; a transconductance amplifier, which is coupled to the load current sense circuit, for generating the feedback signal according to the load current sense signal, a current adjustment reference signal, and a compensation signal; and a compensator, which is coupled to the transconductance amplifier, for generating the compensation signal according to the load current; wherein the compensator adaptively adjusts the frequency of the zero of the compensator gain function and/or the mid-frequency gain of the compensator gain function according to the condition of the load current, such that the number of poles of the system open loop gain function is at most more than the number of zeroes of the system open loop gain function by one under the crossover frequency.

In the aforementioned embodiment, the compensator preferably includes: a variable RC circuit, which is coupled to the transconductance amplifier, for adjusting an RC parameter of the variable RC circuit according to a load determination signal to compensate an output of the transconductance amplifier, so as to adjust the frequency of the zero of the compensator gain function and/or the mid-frequency gain of the compensator gain function; and a load determination circuit, for generating the load determination signal according to the load current and a load reference signal.

In the aforementioned embodiment, the compensator preferably further includes a hysteresis circuit, which is coupled between the variable RC circuit and the load determination circuit, for adjusting the load determination signal by a hysteresis effect.

In the aforementioned embodiment, preferably, the load determination circuit determines whether the load circuit is in a light load condition or a heavy load condition according to the load current, and when the load circuit is determined to be in the heavy load condition, the variable RC circuit adjusts the frequency of the zero of the compensator gain function to cancel the pole of an uncompensated system loop gain function corresponding to a target heavy load condition; when the load circuit is determined to be in the light load condition, the variable RC circuit adjusts the frequency of the zero of the compensator gain function and/or the mid-frequency gain of the compensator gain function, such that the number of poles of the system open loop gain function is at most more than the number of zeroes of the system open loop gain function by one under the crossover frequency.

From another perspective, the present invention provides a control method of a flyback power converter, wherein the flyback power converter is for converting an input voltage to an output voltage, and providing a load current to a load circuit, the control method comprising: operating a power switch according to an operation signal, to convert the input voltage to the output voltage and provide the load current; generating a voltage sense signal according to the output voltage; generating a switch current sense signal according to a switch current flowing through the power switch; generating a feedback signal according to the load current; generating the operation signal according to the voltage sense signal, the switch current sense signal, and the feedback signal; and adaptively adjusting a frequency of a zero of a compensator gain function and/or a mid-frequency gain of the compensator gain function according to a condition of the load current, such that a number of poles of a system open loop gain function of the flyback power converter is at most more than a number of zeroes of the system open loop gain function by one under a crossover frequency.

In one preferable embodiment, the step of generating the operation signal according to the feedback signal includes: generating an opto-coupler signal according to the feedback signal; and generating the operation signal according to the opto-coupler signal.

In one preferable embodiment, the step of adaptively adjusting a frequency of a zero of a compensator gain function and/or a mid-frequency gain of the compensator gain function includes: regulating the load current; generating a load current sense signal according to the load current; generating the feedback signal according to the load current sense signal, a current adjustment reference signal, and a compensation signal; and generating the compensation signal according to the load current to adjust the frequency of the zero of the compensator gain function and/or the mid-frequency gain of the compensator gain function, such that the number of poles of the system open loop gain function is at most more than the number of zeroes of the system open loop gain function by one under the crossover frequency.

In the aforementioned embodiment, the step of generating the compensation signal according to the load current preferably includes: adjusting an RC parameter according to a load determination signal, so as to adjust the frequency of the zero of the compensator gain function and/or the mid-frequency gain of the compensator gain function; and generating the load determination signal according to the load current and a load reference signal.

In the aforementioned embodiment, the step of generating the compensation signal according to the load current preferably further includes: adjusting the load determination signal by a hysteresis effect.

In the aforementioned embodiment, the step of generating the load determination according to the load current preferably includes: determining whether the load circuit is in a light load or a heavy load according to the load current, and when the load circuit is determined to be in the heavy load condition, the frequency of the zero of the compensator gain function is adjusted to cancel the pole of an uncompensated system loop gain function corresponding to a target heavy load condition; when the load circuit is determined to be in the light load condition, the frequency of the zero of the compensator gain function and/or the mid-frequency gain of the compensator gain function are adjusted, such that the number of poles of the system open loop gain function is at most more than the number of zeroes of the system open loop gain function by one under the crossover frequency.

From another perspective, the present invention provides a secondary side control circuit of a flyback power converter, wherein the flyback power converter is for converting an input voltage to an output voltage, and providing a load current to a load circuit, and the flyback power converter includes: a transformer circuit having a primary winding for receiving the input voltage, a secondary winding for generating the output voltage at an output node, and a tertiary winding for generating a voltage sense signal according to the output voltage; a power switch circuit, which is coupled to the primary winding, for operating a power switch therein according to an operation signal, so as to convert the input voltage to the output voltage; a switch current sense circuit, which is coupled to the power switch circuit, for generating a switch current sense signal according to a switch current flowing through the power switch; a primary side control circuit, which is coupled to the tertiary winding, the switch current sense circuit, and the power switch circuit, for generating the operation signal according to the voltage sense signal, the switch current sense signal, and a feedback signal; and the secondary side control circuit, which is coupled to the output node and the primary side circuit; the secondary side control circuit comprising: a current regulator coupled to the load circuit, for regulating the load current; a load current sense circuit, which is coupled to the current regulator, for generating a load current sense signal according to the load current; a transconductance amplifier, which is coupled to the load current sense circuit, for generating the feedback signal according to the load current sense signal, a current adjustment reference signal, and a compensation signal; and a compensator, which is coupled to the transconductance amplifier, for generating the compensation signal according to the load current; wherein the compensator is for generating the feedback signal according to the load current, and adaptively adjusting a frequency of a zero of a compensator gain function and/or a mid-frequency gain of the compensator gain function according to a condition of the load current, such that a number of poles of a system open loop gain function of the flyback power converter is at most more than a number of zeroes of the system open loop gain function by one under a crossover frequency.

In one preferable embodiment, the flyback power converter further includes an opto-coupler circuit, which is coupled between the primary side circuit and the secondary side circuit, for generating an opto-coupler signal which is inputted to the primary side control circuit according to the feedback signal.

In one preferable embodiment, the compensator includes: a variable RC circuit, which is coupled to the transconductance amplifier, for adjusting an RC parameter of the variable RC circuit according to a load determination signal to compensate an output of the transconductance amplifier, so as to adjust the frequency of the zero of the compensator gain function and/or the mid-frequency gain of the compensator gain function; and a load determination circuit, for generating the load determination signal according to the load current and a load reference signal.

In the aforementioned embodiment, the compensator preferably further includes a hysteresis circuit, which is coupled to the variable RC circuit and the load determination circuit, for adjusting the load determination signal by a hysteresis effect.

In the aforementioned embodiment, preferably, the load determination circuit determines whether the load circuit is in a light load condition or a heavy load condition according to the load current, and when the load circuit is determined to be in the heavy load condition, the variable RC circuit adjusts the frequency of the zero of the compensator gain function to cancel the pole of an uncompensated system loop gain function corresponding to a target heavy load condition; when the load circuit is determined to be in the light load condition, the variable RC circuit adjusts the frequency of the zero of the compensator gain function and/or the mid-frequency gain of the compensator gain function, such that the number of poles of the system open loop gain function is at most more than the number of zeroes of the system open loop gain function by one under the crossover frequency.

The objectives, technical details, features, and effects of the present invention will be better understood with regard to the detailed description of the embodiments below.

DESCRIPTION OF THE PREFERRED EMBODIMENTS

The drawings as referred to throughout the description of the present invention are for illustration only, to show the interrelations between the circuits and the signal waveforms, but not drawn according to actual scale.

Figure 1A:
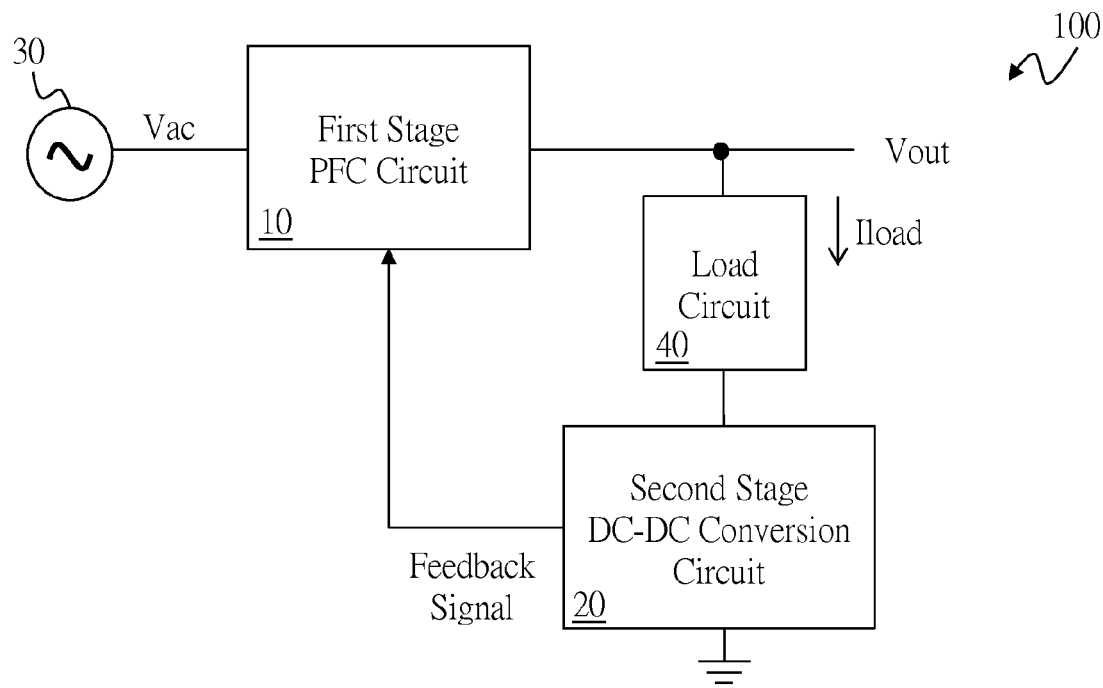
FIGS. 1A and 1B show schematic diagrams of a conventional flyback power converter 100 and signal waveforms of the output voltage and the load current thereof.
Figure 1B:
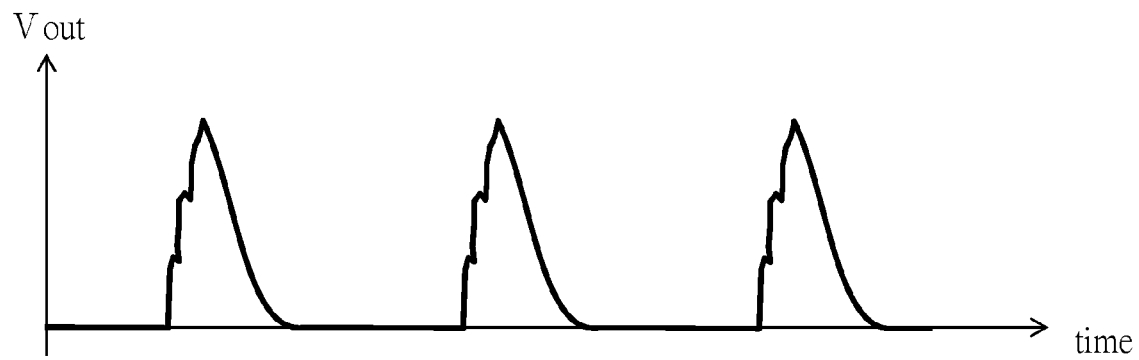
Figure 1B:
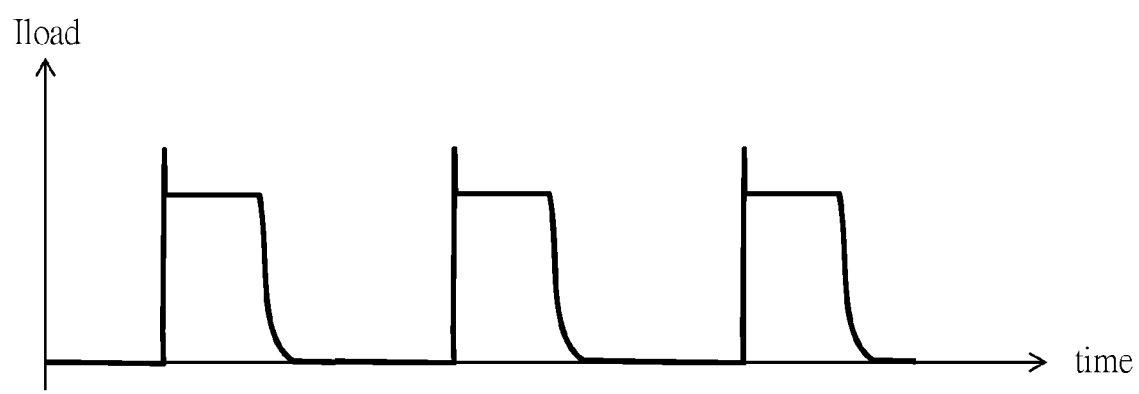
Figure 2:
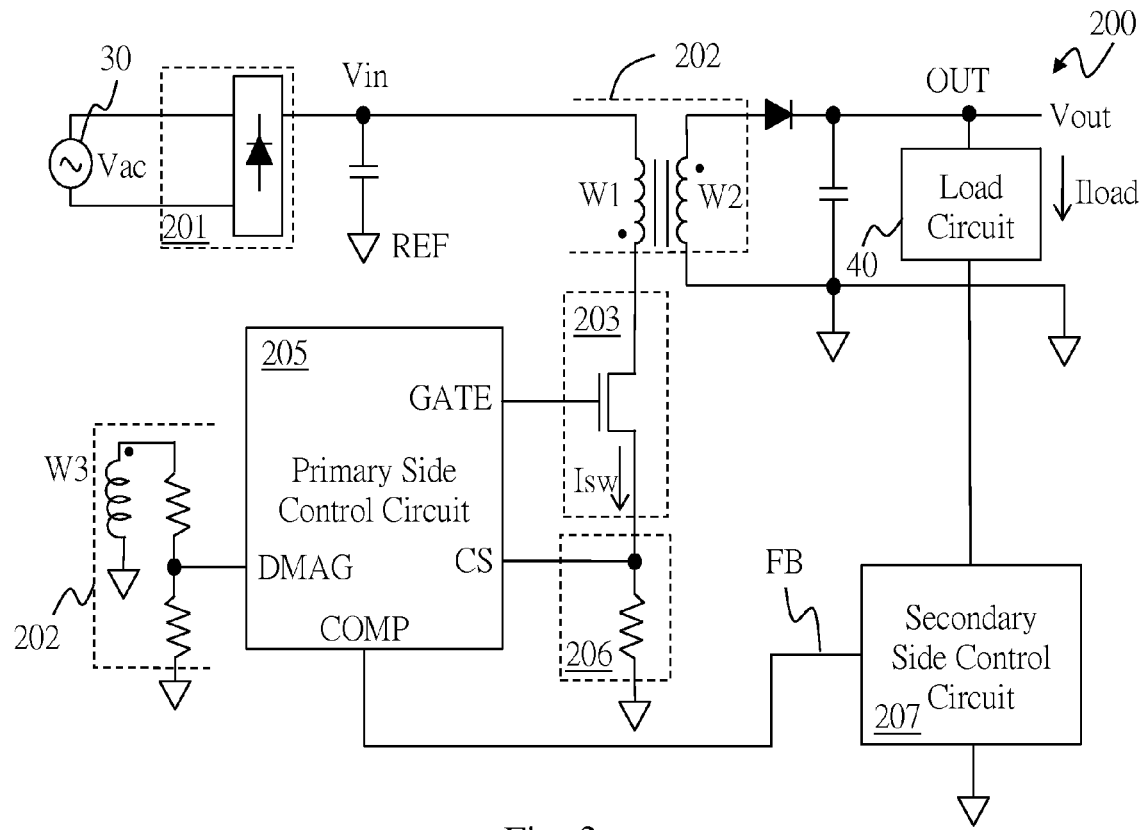
FIG. 2 shows a first embodiment of the present invention.

FIG. 2 shows a first embodiment according to the present invention. As shown in FIG. 2, an AC power source 30 generates an AC voltage Vac. A rectifier circuit 201 rectifies the AC voltage Vac to generate an input voltage Vin. The rectifier circuit is for example but not limited to a bridge rectifier circuit. The flyback power converter 200 converts the input voltage Vin to an output voltage Vout, and provides a load current Iload to a load circuit 40. The flyback power converter 200 includes: a transformer circuit 202, a power switch circuit 203, a primary side control circuit 205, a switch current sense circuit 206, and a secondary side control circuit 207.

The transformer circuit 202 includes a primary winding W1, a secondary winding W2, and a tertiary winding W3. The secondary winding W2, the secondary side control circuit 207, the tertiary winding W3, and the switch current sense circuit 206 are coupled to a reference level REF. The primary winding W1 is for receiving the input voltage Vin. The secondary winding W2 is for generating the output voltage Vout at an output node OUT. The tertiary winding W3 is for generating a voltage sense signal DMAG according to the output voltage Vout. The power switch circuit 203 is coupled to the primary winding W1, for operating a power switch therein according to an operation signal GATE, so as to convert the input voltage Vin to the output voltage Vout. The switch current sense circuit 206 is coupled to the power switch circuit 203, for generating a switch current sense signal CS according to a switch current Isw flowing through the power switch.

The primary side control circuit 205 is coupled to the tertiary winding W3, the switch current sense circuit 206, and the power switch circuit 203, for generating the operation signal GATE according to the voltage sense signal DMAG, the switch current sense signal CS, and a feedback signal FB.

The secondary side control circuit 207 is coupled to the output node OUT, for generating the feedback signal FB according to the load current Iload, and adaptively adjusting a frequency of a zero of a compensator gain function and/or a mid-frequency gain of the compensator gain function according to a condition of the load current Iload, such that a number of poles of a system open loop gain function (frequency being a variable of the function) of the flyback power converter 200 is at most more than a number of zeroes of the system open loop gain function by one under a crossover frequency, to increase the phase margin. The details of the secondary side control circuit 207 will be explained later with reference to other embodiments.

Figure 3:
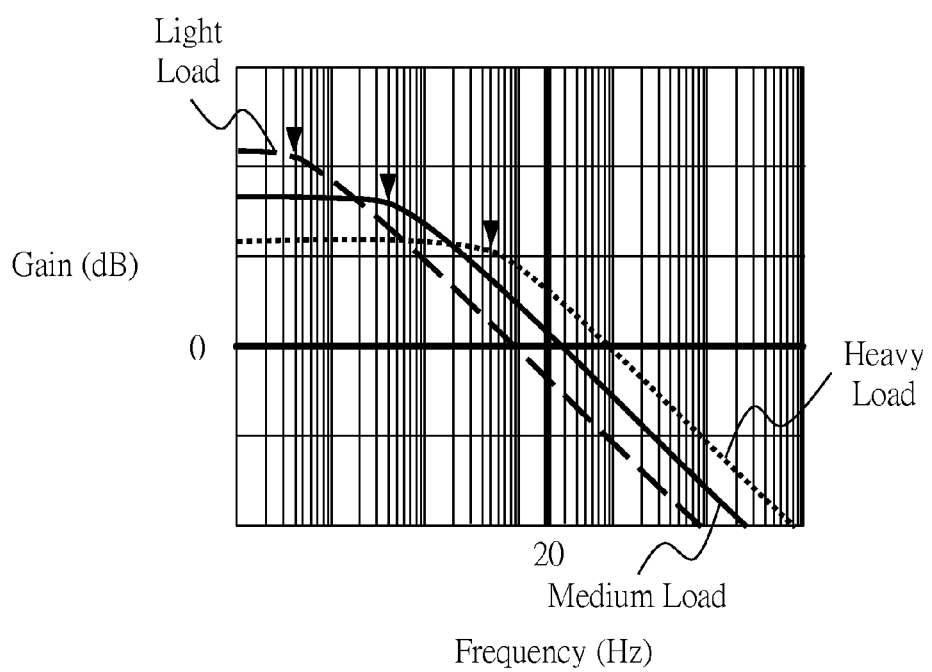
FIG. 3 shows a schematic diagram of uncompensated system loop gain functions in a heavy load condition, a medium load condition, and a light load condition.

FIG. 3 shows a schematic diagram of uncompensated system loop gain functions of a heavy load condition, a medium load condition, and a light load condition. The heavy load condition is when the load circuit 40 consumes a relatively higher load current Iload, and the light load is when the load circuit 40 consumes a relatively lower load current Iload. The poles of uncompensated system loop gain functions of the heavy load condition, the medium load condition, and the light load condition of the load circuit 40 are indicated by solid triangles in the figure. As shown in the figure, the pole of the uncompensated system loop gain function when the load circuit 40 is in the heavy load condition, is at a frequency higher than a frequency of the pole of the uncompensated system loop gain function when the load circuit 40 is in the medium load condition or the light load condition. That is, when the load circuit 40 is in the heavy load condition, medium load condition, and the light load condition, the frequency of the pole of the corresponding uncompensated system loop gain function changes from high to low.

Thus, under different load conditions, if the compensation method remains unchanged (for example, still using the parameters designed for the heavy load condition), then when the load circuit 40 is in the light load condition, the control system of the flyback power converter 200 may be unstable. For example, when the load circuit 40 is a dimmable LED circuit, the load current Iload may be adjusted. The load circuit 40 may be in the heavy load condition when the LED circuit is in full brightness or in the light load condition when the LED circuit is adjusted to a lower brightness. In the prior art, the compensation is only designed for the heavy load condition, and thus when the LED circuit is the light load condition, the control system becomes unstable; the LED circuit may flicker, or the LED circuit can not be tuned to a low brightness. In the present invention, the compensation is adaptively adjusted, which will be explained in more detail later.

Figure 4:
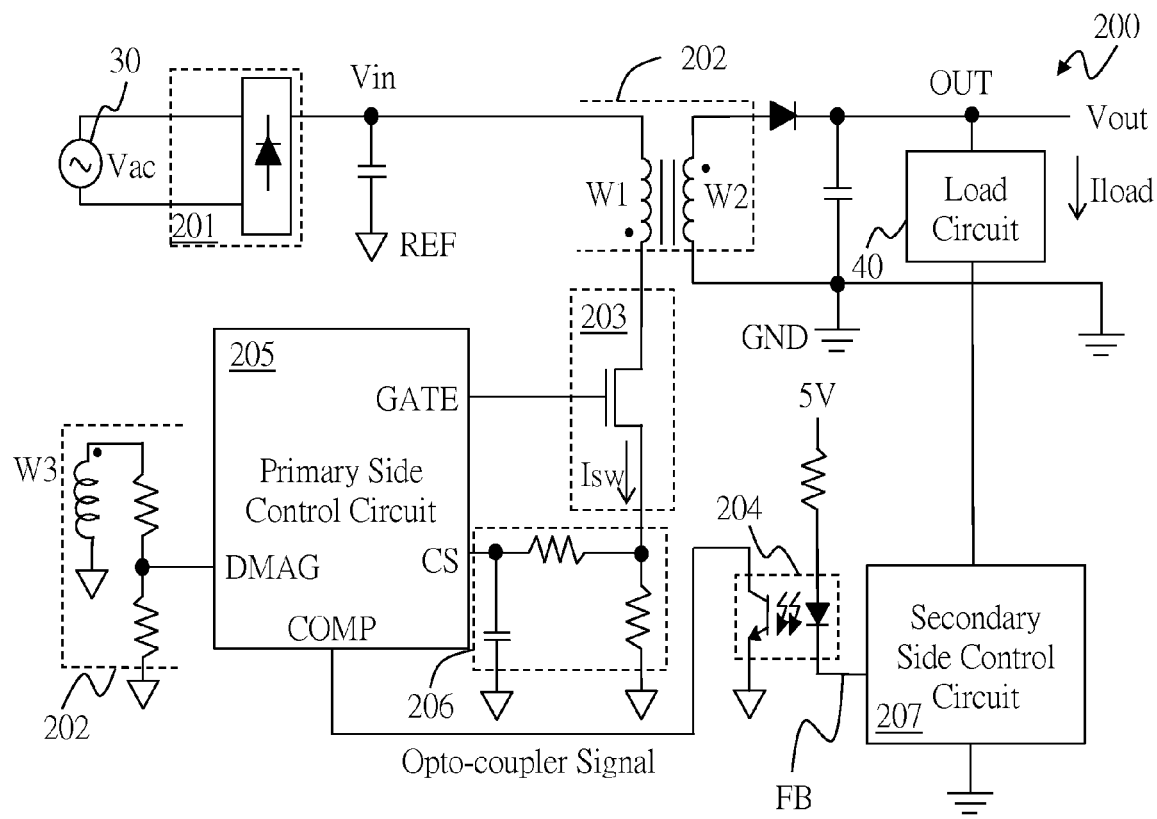
FIG. 4 shows a second embodiment of the present invention.

FIG. 4 shows a flyback power converter according to another embodiment of the present invention. In this embodiment, the flyback power converter 200 includes: the transformer circuit 202, the power switch circuit 203, an opto-coupler circuit 204, the primary side control circuit 205, the switch current sense circuit 206, and the secondary side control circuit 207.

The transformer circuit 202 includes the primary winding W1, the secondary winding W2, and the tertiary winding W3. The secondary winding W2 and the secondary side control circuit 207 are electrically connected to a ground level GND. The tertiary winding W3, and the switch current sense circuit 206 are coupled to the reference level REF. The primary winding W1 is for receiving the input voltage Vin. The secondary winding W2 is for generating the output voltage Vout at the output node OUT. The tertiary winding W3 is for generating a voltage sense signal DMAG according to the output voltage Vout. The power switch circuit 203 is coupled to the primary winding W1, for operating the power switch therein according to the operation signal GATE, so as to convert the input voltage Vin to the output voltage Vout. The switch current sense circuit 206 is coupled to the power switch circuit 203, for generating the switch current sense signal CS according to the switch current Isw flowing through the power switch.

The opto-coupler circuit 204 is coupled to the secondary side control circuit 207, for generating an opto-coupler signal COMP according to the feedback signal relating to the load current Iload. The primary side control circuit 205 is coupled to the tertiary winding W3, the switch current sense circuit 206, the opto-coupler circuit 204, and the power switch circuit 203, for generating the operation signal GATE according to the voltage sense signal DMAG, the switch current sense signal CS, and the opto-coupler signal COMP.

The secondary side control circuit 207 is coupled to the output node OUT and the opto-coupler circuit 204, for adaptively adjusting the frequency of the zero of the compensator gain function and/or the mid-frequency gain of the compensator gain function according to a condition of the load current Iload, such that a number of poles of a system open loop gain function (frequency being a variable of the function) of the flyback power converter 200 is at most more than a number of zeroes of the system open loop gain function by one under a crossover frequency. The details of the secondary side control circuit 207 will be explained later with reference to other embodiments.

Figure 5:
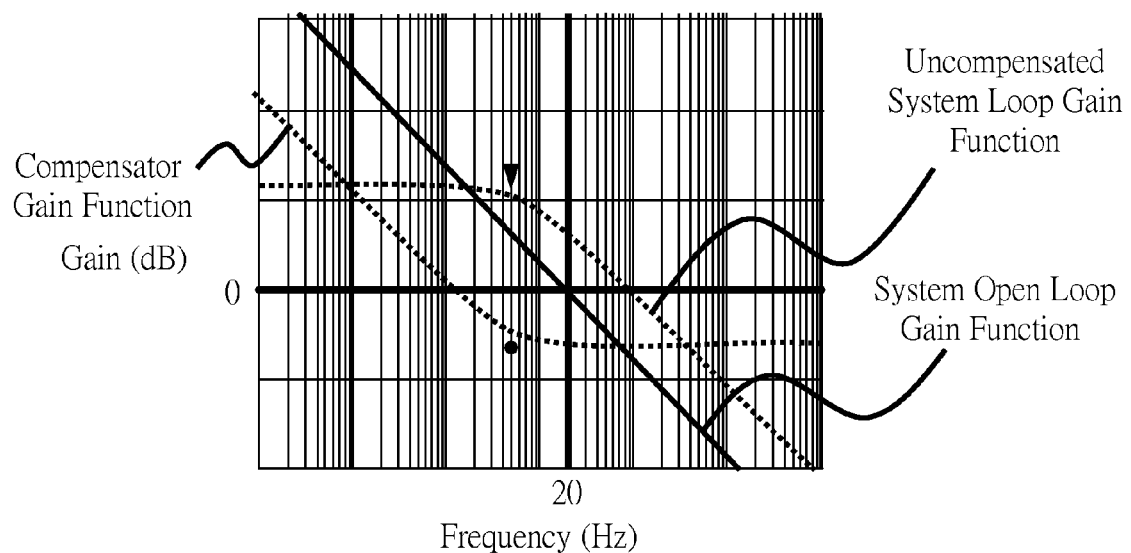
FIG. 5 shows a schematic diagram of an uncompensated system loop gain function, a compensator gain function, and a system open loop gain function of a heavy load condition.

Please refer to FIG. 5, and also refer to FIG. 3. FIG. 5 shows a schematic diagram of the uncompensated system loop gain function, the compensator gain function, and the system open loop gain function corresponding to a target heavy load condition. The compensator gain function is designed to cope with the target heavy load condition, such that the zero of the compensator gain function (as indicated by a solid circle shown in FIG. 5) is at a same frequency as the pole of the uncompensated system loop gain function of the target heavy load condition, whereby the pole (as indicated by a solid triangle shown in FIG. 5) is cancelled by the zero, and thus the number of poles of the system open loop gain function is at most more than the number of zeroes of the system open loop gain function by one under the crossover frequency. For example, as shown in FIG. 5, the system open loop gain function is a one order gain function, which crosses over 0 dB (which is where the crossover frequency is determined) with a slope of −20 dB/decade. The crossover frequency is usually determined at about 20 Hz for optimum power factor correction effect. The uncompensated system loop gain function, the compensator gain function, the system open loop gain function, the crossover frequency, the mid-frequency gain, the pole, and the zero are well known by those skilled in the art, so details thereof are not redundantly explained here.

Figure 6:
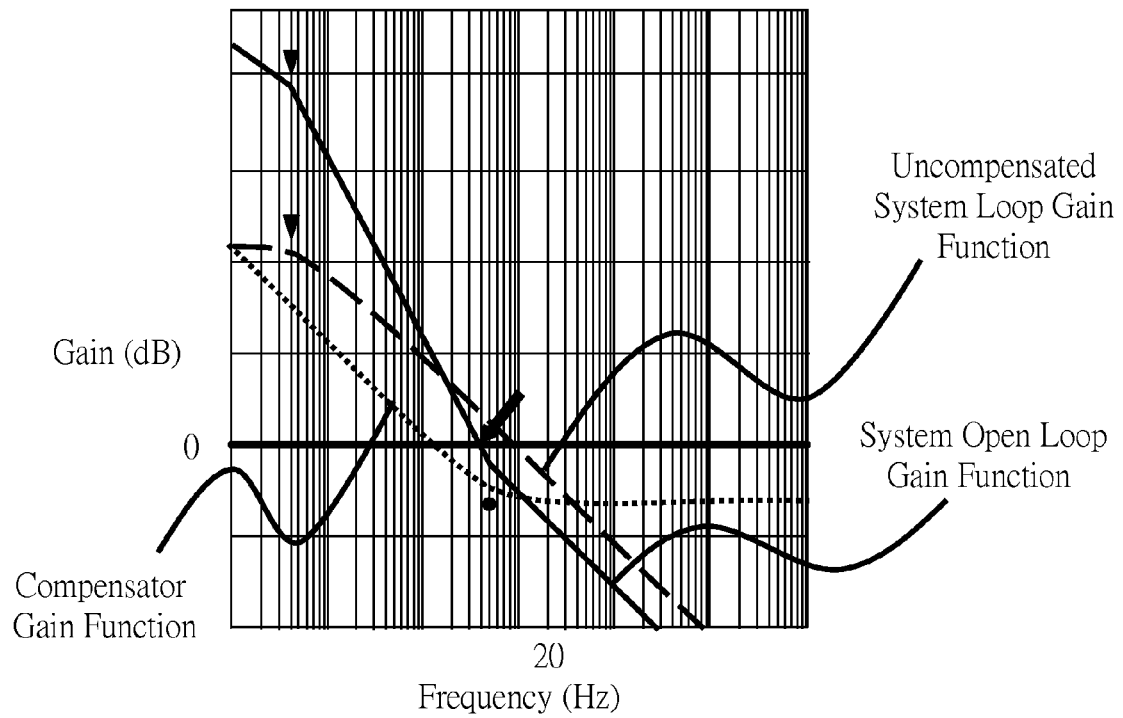
FIG. 6 shows a schematic diagram of an uncompensated system loop gain function, a compensator gain function, and a system open loop gain function of a light load condition in a prior art.

FIG. 6 shows a schematic diagram of the uncompensated system loop gain function, the compensator gain function, and the system open loop gain function corresponding to a light load condition of the load circuit 40 in the prior art, for illustrating the advantages of the present invention over the prior art. As shown in the figure, in the prior art, the same compensator gain function is used for the heavy load condition and the light load condition. However, the pole of the uncompensated system loop gain function for the light load condition, is at a frequency lower than that in the heavy load condition. As shown in the figure, in the prior art, the system is unstable because the system open loop gain function for the light load condition is obtained by compensating the uncompensated system loop gain function with the compensator gain function deigned for the target heavy load condition. The system open loop gain function crosses over 0 dB (where the crossover frequency is determined, as indicated by a solid arrow) with a slope of −40 dB/decade, which indicates that, after the poles and the zeros are mutually cancelled, there are two poles left in the system open loop gain function under the crossover frequency, causing the system to be unstable.

Figure 7:
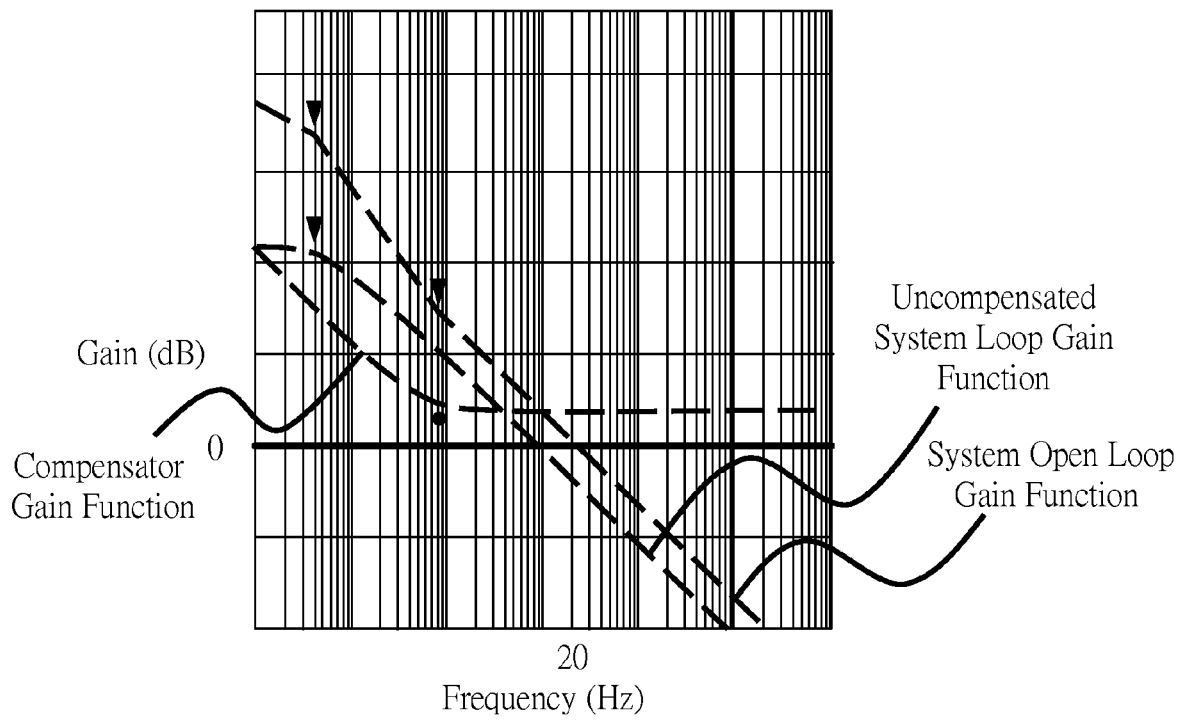
FIG. 7 shows a schematic diagram of an uncompensated system loop gain function, a compensator gain function, and a system open loop gain function of a light load condition in the present invention.

FIG. 7 shows a schematic diagram of the uncompensated system loop gain function, the compensator gain function, and the system open loop gain function of the light load condition of the present invention. Different from the gain functions shown in FIG. 6, the present invention adaptively adjusts the frequency of the zero of the compensator gain function and/or the mid-frequency gain of the compensator gain function according to the condition of the load current, such that the number of poles of the system open loop gain function is at most more than the number of zeroes of the system open loop gain function by one under the crossover frequency. For example, as shown in FIG. 7, when the load current Iload is relatively lower, according to the present invention, the frequency of the zero of the compensator gain function and/or the mid-frequency gain of the compensator gain function, are/is adaptively adjusted, for example by reducing the frequency of the zero and/or increasing the mid-frequency gain. As a result, the number of poles of the system open loop gain function is at most more than the number of zeroes of the system open loop gain function by one under the crossover frequency, and the system open loop gain function crosses over 0 dB at the crossover frequency with a slope of −20 dB/decade.

Figure 8:
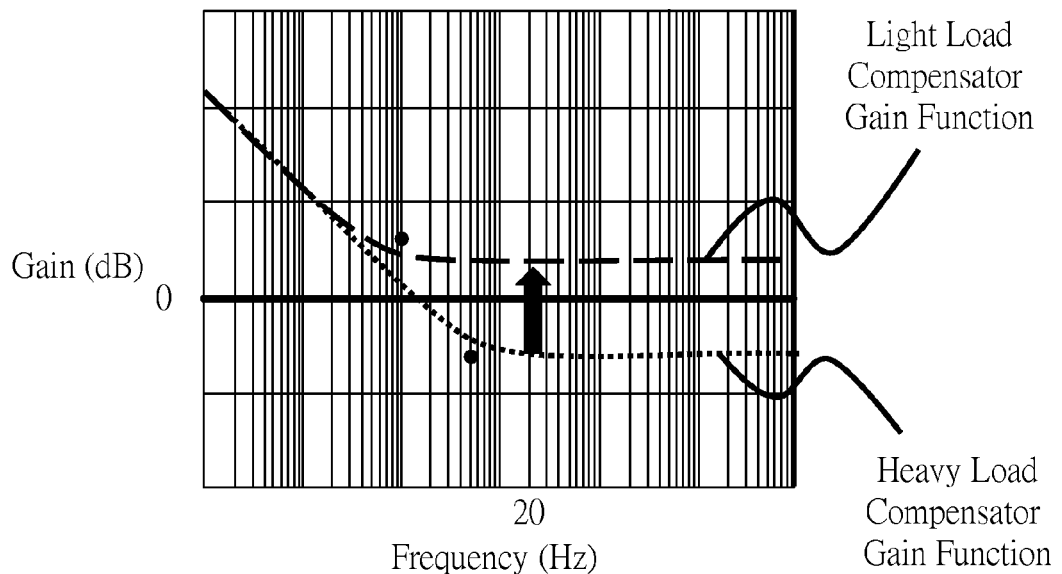
FIG. 8 shows a diagram of the compensator gain functions of the heavy load condition and the light load condition according to the present invention.

FIG. 8 shows a schematic diagram of the compensator gain functions of the heavy load condition and the light load condition according to the present invention. FIG. 8 shows that the present invention adaptively adjusts the frequency of the zero and/or the mid-frequency gain of the compensator gain function according to the load current Iload. In the shown example, the present invention reduces the frequency of the zero (as indicated by the solid circles in the figure) and/or increases the mid-frequency gain (as indicated by a solid arrow in the figure) of the compensator gain function for the light load condition, as compared to the heavy load condition.

Figure 9:
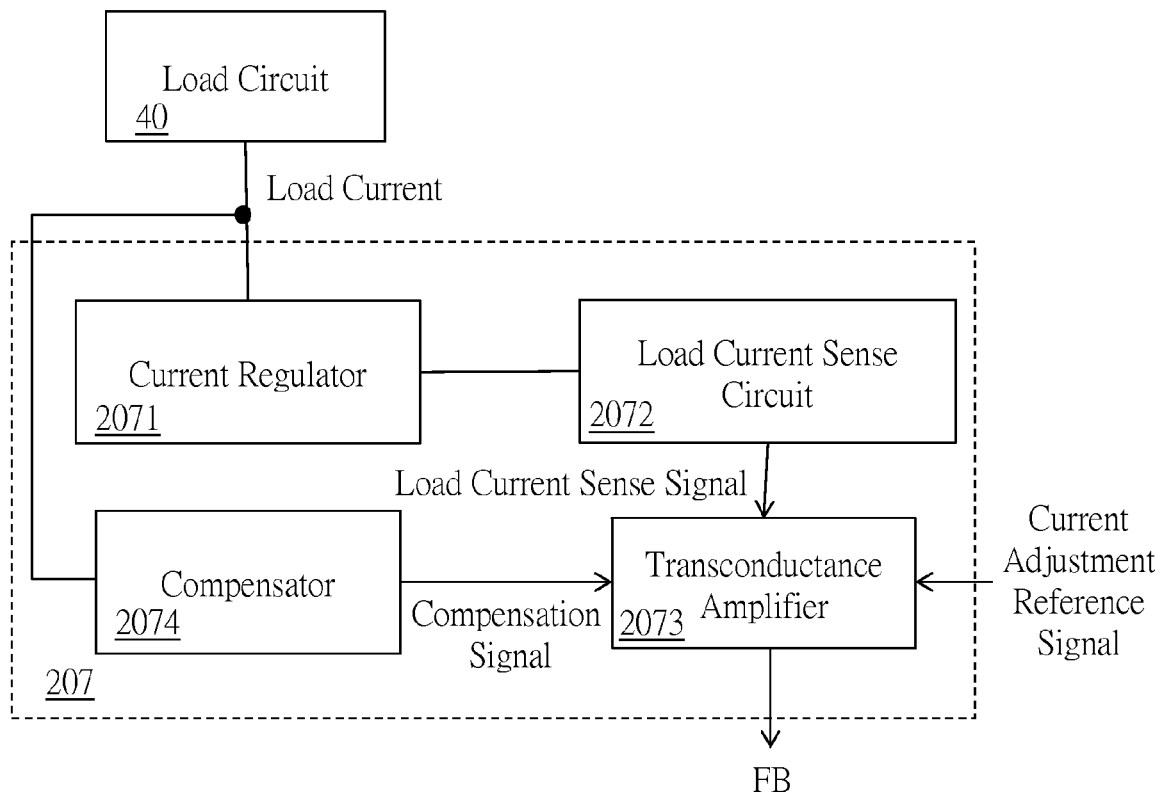
FIG. 9 shows a third embodiment of the present invention.

FIG. 9 shows a third embodiment of the present invention, which is an embodiment of the secondary side control circuit 207. As shown in the figure, the secondary side control circuit 207 includes: a current regulator 2071, a load current sense circuit 2072, a transconductance amplifier 2073, and a compensator 2074. The current regulator 2071 is coupled to the load circuit 40, for regulating the load current Iload. The load current sense circuit 2072 is coupled to the current regulator 2071, for sensing the load current Iload and generating a load current sense signal according to the load current Iload. The transconductance amplifier 2073 is coupled to the load current sense circuit 2072, for generating the feedback signal FB according to the load current sense signal, a current adjustment reference signal, and a compensation signal. The compensator 2074 is coupled to the transconductance amplifier 2073, for generating the compensation signal according to the load current Iload. The compensator 2074 adaptively adjusts the frequency of the zero of the compensator gain function and/or the mid-frequency gain of the compensator gain function according to the condition of the load current Iload, such that the number of poles of the system open loop gain function is at most more than the number of zeroes of the system open loop gain function by one under the crossover frequency.

Figure 10:
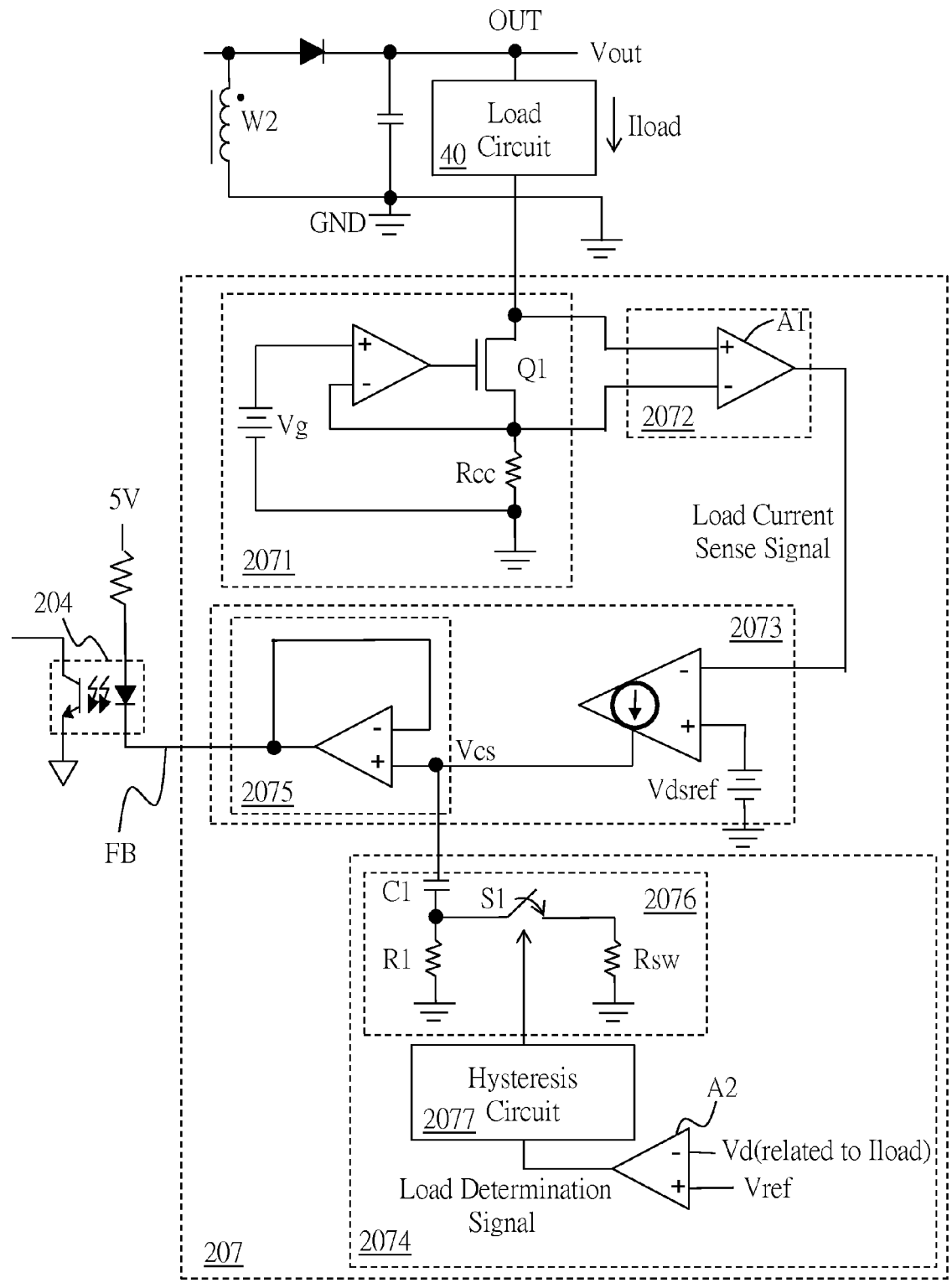
FIG. 10 shows a fourth embodiment of the present invention.

FIG. 10 shows a fourth embodiment of the present invention, which is a more specific embodiment of the secondary side control circuit 207. As shown in the figure, in this embodiment, the current regulator 2071 regulates the load current at a current which is equal to Vg/Rcc. The load current sense circuit 2072 for example includes an amplifier A1, which generates the load current sense signal by amplifying a voltage difference between a source and a drain of a switch Q1, which is related to the load current Iload. The load current sense signal is inputted to the transconductance amplifier 2073. The transconductance amplifier 2073 generates the feedback signal FB according to the load current sense signal, a current adjustment reference signal Vdsref, and a compensation signal Vcs. The transconductance amplifier 2073 can optionally further includes a unit gain circuit 2075 as shown in the figure. The compensator 2074 generates the compensation signal Vcs according to the load current Iload (to be explained hereunder), to adaptively adjust the frequency of the zero of the compensator gain function and/or the mid-frequency gain of the compensator gain function, such that the number of poles of the system open loop gain function is at most more than the number of zeroes of the system open loop gain function by one under the crossover frequency. As shown in the figure, the compensator 2074 includes a variable RC circuit 2076, a load determination circuit, and a hysteresis circuit 2077. The variable RC circuit 2076 is coupled to the transconductance amplifier 2073, for compensating the output of the transconductance amplifier 2073 according to a load determination signal, so as to adjust the frequency of the zero of the compensator gain function and/or the mid-frequency gain of the compensator gain function. The variable RC circuit 2076 for example includes a capacitor C1 and resistors R1 and Rsw, wherein the resistors R1 and Rsw are connected in parallel, and separated by a switch S1. The variable RC circuit 2076 adjusts a resistance of the parallel circuit formed by the resistors R1 and Rsw connected in parallel (and therefore adjusts the RC parameter of the RC circuit 2076) according to whether the load determination signal turns ON or OFF the switch S1. The load determination circuit for example includes a comparator A2 as shown in the figure, which generates the load determination signal according to a voltage Vd and a load reference signal Vref, wherein the voltage Vd is related to the load current Iload. The voltage Vd for example can be the load current sense signal, which is an output signal of the load current sense circuit 2072, or can be any other signal related to the load current Iload. The hysteresis circuit 2077 is coupled to the variable RC circuit 2076 and the load determination circuit, to provide a hysteresis effect on the load determination signal.

In the fourth embodiment, the load determination circuit determines whether the load circuit 40 is in the light load condition or the heavy load condition according to the load current Iload. When the load circuit 40 is determined to be in the heavy load condition, the variable RC circuit 2076 adjusts the frequency of the zero of the compensator gain function (such as by turning ON the switch S1) to cancel the pole of an uncompensated system loop gain function, as it is designed for the target heavy load condition. When the load circuit 40 is determined to be in the light load condition, the variable RC circuit 2076 adjusts the frequency of the zero of the compensator gain function and/or the mid-frequency gain of the compensator gain function (such as by turning OFF the switch S1), such that the number of poles of the system open loop gain function is at most more than the number of zeroes of the system open loop gain function by one under the crossover frequency.

Figure 11:
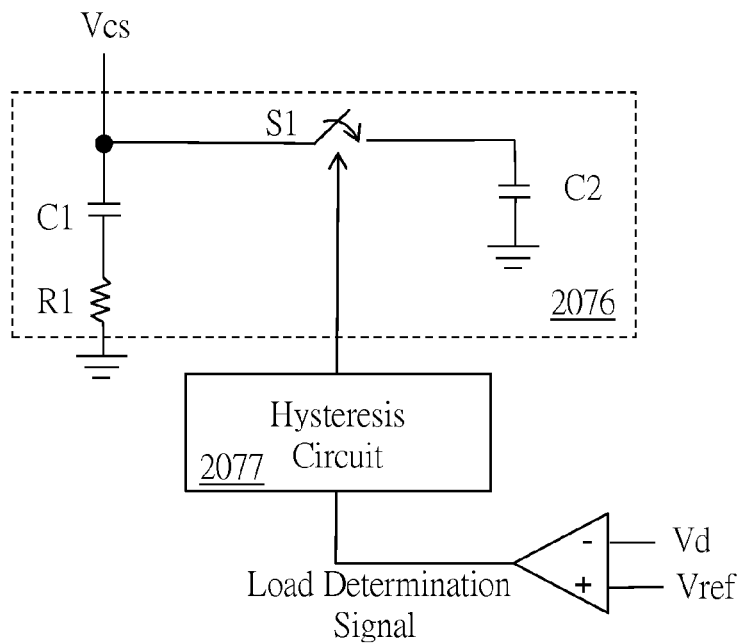
FIG. 11 shows a fifth embodiment of the present invention.

FIG. 11 shows a fifth embodiment of the present invention, which shows another embodiment of the variable RC circuit 2076. As shown in the figure, this embodiment is different from the fourth embodiment in that, in this embodiment, there are two capacitors C1 and C2 and one resistor R1 instead of one capacitor C1 and two resistors R1 and Rsw, wherein the capacitors C1 and C2 are separated by a switch S1 in between, i.e., the variable RC circuit 2076 can adjust its capacitance according to the load current Iload, so as to adjust the RC parameter of the RC circuit 2076. In contrast, in the fourth embodiment, the variable RC circuit 2076 adjusts the RC parameter by adjusting its resistance, not the capacitance. However, certainly, according to the present invention, the resistance and the capacitance of the variable RC circuit 2076 can be both adjustable.

Figure 12:
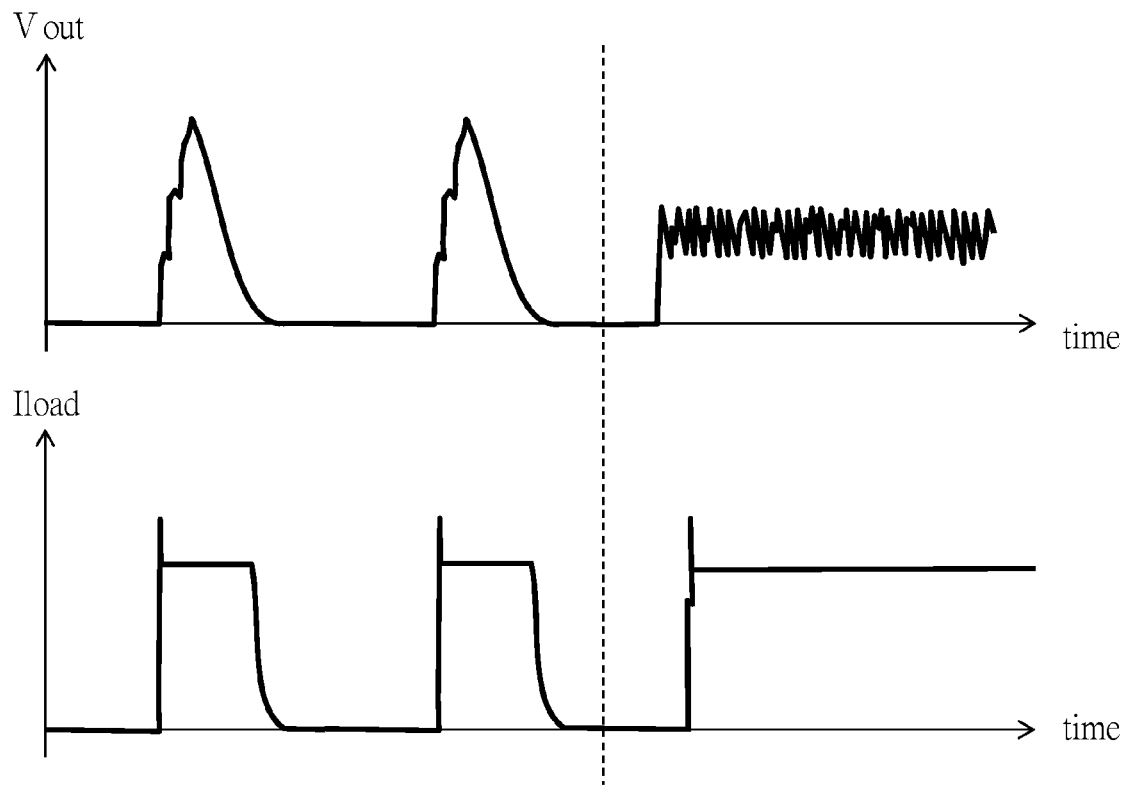
FIG. 12 is a schematic diagram showing a comparison of signal waveforms of the output voltages and the load currents of the prior art and the present invention.

FIG. 12 shows a schematic diagram of signal waveforms of the output voltages Vout and the load currents Iload of the prior art and the present invention. The left side of a dashed straight line as shown in the figure shows the prior art wherein, as explain in the aforementioned description, the output voltage Vout and the load current Iload are conductive only intermittently, causing flickers in LEDs. The right side of the dashed straight line as shown in the figure shows that, in the present invention, the output voltage Vout and the load current Iload are stably conducting, so the LEDs do not flicker. In applications different from LEDs, this means that the present invention can stably function in a lighter load condition, so the present invention increases the application range of the flyback power converter.

Figure 13:
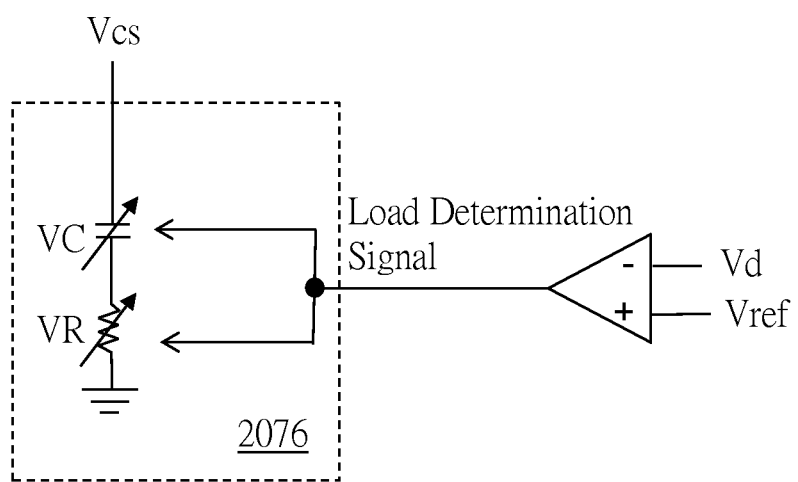
FIG. 13 shows a sixth embodiment of the present invention.

FIG. 13 shows a sixth embodiment of the present invention, which shows another embodiment of the variable RC circuit 2076. In the fourth and fifth embodiment, the power converter is switchable between two different compensations under control by a switch; the sixth embodiment shows that, under the same spirit of the present invention, the power converter can be switchable between three or more different compensations; in addition, the switching is not limited to being controlled by a switch, but can be achieved by providing a variable resistor VR and/or a variable capacitor VC. By adjusting the resistance of the variable resistor VR and/or the capacitance of the variable capacitor VC according to the load current Iload, the RC parameter of the variable RC circuit 2076 can be adjusted.

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention. For example, a device or circuit which does not substantially influence the primary function of a signal can be inserted between any two devices or circuits in the shown embodiments, so the term "couple" should include direct and indirect connections. For another example, the resistors or the voltage divider circuit is not limited to a circuit formed by passive devices, but it may be formed by other circuits, such as transistors. For another example, inverted and non-inverted input terminals of the amplifier circuit and the comparator are interchangeable, with corresponding amendments of the circuits processing these signals. In view of the foregoing, the spirit of the present invention should cover all such and other modifications and variations, which should be interpreted to fall within the scope of the following claims and their equivalents.

What is claimed is:

1. A flyback power converter, configured to operably convert an input voltage to an output voltage, and provide a load current to a load circuit, the flyback power converter comprising:
    a transformer circuit, which includes:
        a primary winding, configured to operably receive the input voltage;
        a secondary winding, configured to operably generate the output voltage at an output node; and
        a tertiary winding, configured to operably generate a voltage sense signal according to the output voltage;
    a power switch circuit, which is coupled to the primary winding, and configured to operably operate a power switch therein according to an operation signal, so as to convert the input voltage to the output voltage;
    a switch current sense circuit, which is coupled to the power switch circuit, and configured to operably generate a switch current sense signal according to a switch current flowing through the power switch;
    a primary side control circuit, which is coupled to the tertiary winding, the switch current sense circuit, and the power switch circuit, and configured to operably generate the operation signal according to the voltage sense signal, the switch current sense signal, and a feedback signal; and
    a secondary side control circuit, which is coupled to the output node and the primary side circuit, and configured to operably generate the feedback signal according to the load current, and adjust a frequency of a zero of a compensator gain function and/or a mid-frequency gain of the compensator gain function according to a condition of the load current, in order that a number of poles of a system open loop gain function of the flyback power converter is at most more than a number of zeroes of the system open loop gain function by one under a crossover frequency.

2. The flyback power converter of claim 1, further comprising an opto-coupler circuit, which is coupled between the primary side circuit and the secondary side circuit, and configured to operably generate an opto-coupler signal which is inputted to the primary side control circuit according to the feedback signal.

3. The flyback power converter of claim 1, wherein the secondary side control circuit includes:
    a current regulator coupled to the load circuit, and configured to operably regulate the load current;
    a load current sense circuit, which is coupled to the current regulator, and configured to operably sense the load current and generate a load current sense signal according to the load current;
    a transconductance amplifier, which is coupled to the load current sense circuit, and configured to operably generate the feedback signal according to the load current sense signal, a current adjustment reference signal, and a compensation signal; and
    a compensator, which is coupled to the transconductance amplifier, and configured to operably generate the compensation signal according to the load current;
    wherein the compensator adjust the frequency of the zero of the compensator gain function and/or the mid-frequency gain of the compensator gain function according to the condition of the load current, in order that the number of poles of the system open loop gain function is at most more than the number of zeroes of the system open loop gain function by one under the crossover frequency.

4. The flyback power converter of claim 2, wherein the secondary side control circuit includes:
    a current regulator coupled to the load circuit, configured to operably regulate the load current;
    a load current sense circuit, which is coupled to the current regulator, and configured to operably sense the load current and generate a load current sense signal according to the load current;
    a transconductance amplifier, which is coupled to the load current sense circuit, and configured to operably generate the feedback signal according to the load current sense signal, a current adjustment reference signal, and a compensation signal; and
    a compensator, which is coupled to the transconductance amplifier, and configured to operably generate the compensation signal according to the load current;

wherein the compensator adjust the frequency of the zero of the compensator gain function and/or the mid-frequency gain of the compensator gain function according to the condition of the load current, in order that the number of poles of the system open loop gain function is at most more than the number of zeroes of the system open loop gain function by one under the crossover frequency.

5. The flyback power converter of claim 3, wherein the compensator includes:
a variable RC circuit, which is coupled to the transconductance amplifier, and configured to operably adjust an RC parameter of the variable RC circuit according to a load determination signal to compensate an output of the transconductance amplifier, so as to adjust the frequency of the zero of the compensator gain function and/or the mid-frequency gain of the compensator gain function; and
a load determination circuit, configured to operably generate the load determination signal according to the load current and a load reference signal.

6. The flyback power converter of claim 4, wherein the compensator includes:
a variable RC circuit, which is coupled to the transconductance amplifier, and configured to operably adjust an RC parameter of the variable RC circuit according to a load determination signal to compensate an output of the transconductance amplifier, so as to adjust the frequency of the zero of the compensator gain function and/or the mid-frequency gain of the compensator gain function; and
a load determination circuit, configured to operably generate the load determination signal according to the load current and a load reference signal.

7. The flyback power converter of claim 5, wherein the compensator further includes a hysteresis circuit, which is coupled between the variable RC circuit and the load determination circuit, and configured to operably adjust the load determination signal by a hysteresis effect.

8. The flyback power converter of claim 6, wherein the compensator further includes a hysteresis circuit, which is coupled between the variable RC circuit and the load determination circuit, and configured to operably adjust the load determination signal by a hysteresis effect.

9. The flyback power converter of claim 5, wherein the load determination circuit determines whether the load circuit is in a light load condition or a heavy load condition according to the load current, and when the load circuit is determined to be in the heavy load condition, the variable RC circuit adjusts the frequency of the zero of the compensator gain function to cancel the pole of an uncompensated system loop gain function corresponding to a target heavy load condition; when the load circuit is determined to be in the light load condition, the variable RC circuit adjusts the frequency of the zero of the compensator gain function and/or the mid-frequency gain of the compensator gain function, in order that the number of poles of the system open loop gain function is at most more than the number of zeroes of the system open loop gain function by one under the crossover frequency.

10. The flyback power converter of claim 6, wherein the load determination circuit determines whether the load circuit is in a light load condition or a heavy load condition according to the load current, and when the load circuit is determined to be in the heavy load condition, the variable RC circuit adjusts the frequency of the zero of the compensator gain function to cancel the pole of an uncompensated system loop gain function corresponding to a target heavy load condition; when the load circuit is determined to be in the light load condition, the variable RC circuit adjusts the frequency of the zero of the compensator gain function and/or the mid-frequency gain of the compensator gain function, such that the number of poles of the system open loop gain function is at most more than the number of zeroes of the system open loop gain function by one under the crossover frequency.

11. A control method of a flyback power converter, wherein the flyback power converter is configured to operably convert an input voltage to an output voltage, and provide a load current to a load circuit, the control method comprising:
operating a power switch according to an operation signal, to convert the input voltage to the output voltage and provide the load current;
generating a voltage sense signal according to the output voltage;
generating a switch current sense signal according to a switch current flowing through the power switch;
generating a feedback signal according to the load current;
generating the operation signal according to the voltage sense signal, the switch current sense signal, and the feedback signal; and
adjusting a frequency of a zero of a compensator gain function and/or a mid-frequency gain of the compensator gain function according to a condition of the load current, in order that a number of poles of a system open loop gain function of the flyback power converter is at most more than a number of zeroes of the system open loop gain function by one under a crossover frequency.

12. The control method of claim 11, wherein the step of generating the operation signal according to the feedback signal includes:
generating an opto-coupler signal according to the feedback signal; and
generating the operation signal according to the opto-coupler signal.

13. The control method of claim 11, wherein the step of adjusting a frequency of a zero of a compensator gain function and/or a mid-frequency gain of the compensator gain function includes:
regulating the load current;
sensing the load current and generating a load current sense signal according to the load current;
generating the feedback signal according to the load current sense signal, a current adjustment reference signal, and a compensation signal; and
generating the compensation signal according to the load current to adjust the frequency of the zero of the compensator gain function and/or the mid-frequency gain of the compensator gain function, in order that the number of poles of the system open loop gain function is at most more than the number of zeroes of the system open loop gain function by one under the crossover frequency.

14. The control method of claim 12, wherein the step of adjusting a frequency of a zero of a compensator gain function and/or a mid-frequency gain of the compensator gain function includes:
regulating the load current;
sensing the load current and generating a load current sense signal according to the load current;

generating the feedback signal according to the load current sense signal, a current adjustment reference signal, and a compensation signal; and generating the compensation signal to adjust the frequency of the zero of the compensator gain function and/or the mid-frequency gain of the compensator gain function, in order that the number of poles of the system open loop gain function is at most more than the number of zeroes of the system open loop gain function by one under the crossover frequency.

15. The control method of claim 13, wherein the step of generating the compensation signal according to the load current includes:
adjusting an RC parameter according to a load determination signal, so as to adjust the frequency of the zero of the compensator gain function and/or the mid-frequency gain of the compensator gain function; and
generating the load determination signal according to the load current and a load reference signal.

16. The control method of claim 14, wherein the step of generating the compensation signal according to the load current includes:
adjusting an RC parameter according to a load determination signal, so as to adjust the frequency of the zero of the compensator gain function and/or the mid-frequency gain of the compensator gain function; and
generating the load determination signal according to the load current and a load reference signal.

17. The control method of claim 15, wherein the step of generating the compensation signal according to the load current further includes: adjusting the load determination signal by a hysteresis effect.

18. The control method of claim 16, wherein the step of generating the compensation signal according to the load current further includes: adjusting the load determination signal by a hysteresis effect.

19. The control method of claim 13, wherein the step of generating the load determination according to the load current includes: determining whether the load circuit is in a light load condition or a heavy load condition according to the load current, and when the load circuit is determined to be in the heavy load condition, the frequency of the zero of the compensator gain function is adjusted to cancel the pole of an uncompensated system loop gain function corresponding to a target heavy load condition; when the load circuit is determined to be in the light load condition, the frequency of the zero of the compensator gain function and/or the mid-frequency gain of the compensator gain function are adjusted, in order that the number of poles of the system open loop gain function is at most more than the number of zeroes of the system open loop gain function by one under the crossover frequency.

20. The control method of claim 14, wherein the step of generating the load determination according to the load current includes: determining whether the load circuit is in a light load condition or a heavy load condition according to the load current, and when the load circuit is determined to be in the heavy load condition, the frequency of the zero of the compensator gain function is adjusted to cancel the pole of an uncompensated system loop gain function corresponding to a target heavy load condition; when the load circuit is determined to be in the light load condition, the frequency of the zero of the compensator gain function and/or the mid-frequency gain of the compensator gain function are adjusted, in order that the number of poles of the system open loop gain function is at most more than the number of zeroes of the system open loop gain function by one under the crossover frequency.

21. A secondary side control circuit of a flyback power converter, wherein the flyback power converter is configured to operably convert an input voltage to an output voltage, and provide a load current to a load circuit, and the flyback power converter includes: a transformer circuit having a primary winding configured to operably receive the input voltage, a secondary winding configured to operably generate the output voltage at an output node, and a tertiary winding configured to operably generate a voltage sense signal according to the output voltage; a power switch circuit, which is coupled to the primary winding, and configured to operably operate a power switch therein according to an operation signal, so as to convert the input voltage to the output voltage; a switch current sense circuit, which is coupled to the power switch circuit, and configured to operably generate a switch current sense signal according to a switch current flowing through the power switch; a primary side control circuit, which is coupled to the tertiary winding, the switch current sense circuit, and the power switch circuit, and configured to operably generate the operation signal according to the voltage sense signal, the switch current sense signal, and a feedback signal; and the secondary side control circuit, which is coupled to the output node and the primary side circuit; the secondary side control circuit comprising:
a current regulator coupled to the load circuit, configured to operably regulate the load current;
a load current sense circuit, which is coupled to the current regulator, and configured to operably generate a load current sense signal according to the load current;
a transconductance amplifier, which is coupled to the load current sense circuit, and configured to operably generate the feedback signal according to the load current sense signal, a current adjustment reference signal, and a compensation signal; and
a compensator, which is coupled to the transconductance amplifier, and configured to operably generate the compensation signal according to the load current;
wherein the compensator is configured to operably generate the feedback signal according to the load current, and adjust a frequency of a zero of a compensator gain function and/or a mid-frequency gain of the compensator gain function according to a condition of the load current, such that a number of poles of a system open loop gain function of the flyback power converter is at most more than a number of zeroes of the system open loop gain function by one under a crossover frequency.

22. The secondary side control circuit of claim 21, wherein the flyback power converter further includes an opto-coupler circuit, which is coupled between the primary side circuit and the secondary side circuit, and configured to operably generate an opto-coupler signal which is inputted to the primary side control circuit according to the feedback signal.

23. The secondary side control circuit of claim 21, wherein the compensator includes:
a variable RC circuit, which is coupled to the transconductance amplifier, and configured to operably adjust an RC parameter of the variable RC circuit according to a load determination signal to compensate an output of the transconductance amplifier, so as to adjust the frequency of the zero of the compensator gain function and/or the mid-frequency gain of the compensator gain function; and a load determination circuit, configured to operably generate the load determination signal according to the load current and a load reference signal.

24. The secondary side control circuit of claim 22, wherein the compensator includes:

a variable RC circuit, which is coupled to the transconductance amplifier, and configured to operably adjust an RC parameter of the variable RC circuit according to a load determination signal to compensate an output of the transconductance amplifier, so as to adjust the frequency of the zero of the compensator gain function and/or the mid-frequency gain of the compensator gain function; and a load determination circuit, configured to operably generate the load determination signal according to the load current and a load reference signal.

25. The secondary side control circuit of claim 23, wherein the compensator further includes a hysteresis circuit, which is coupled to the variable RC circuit and the load determination circuit, and configured to operably adjust the load determination signal by a hysteresis effect.

26. The secondary side control circuit of claim 24, wherein the compensator further includes a hysteresis circuit, which is coupled to the variable RC circuit and the load determination circuit, and configured to operably adjust the load determination signal by a hysteresis effect.

27. The secondary side control circuit of claim 23, wherein the load determination circuit determines whether the load circuit is in a light load condition or a heavy load condition according to the load current, and when the load circuit is determined to be in the heavy load condition, the variable RC circuit adjusts the frequency of the zero of the compensator gain function to cancel the pole of an uncompensated system loop gain function corresponding to a target heavy load condition; when the load circuit is determined to be in the light load condition, the variable RC circuit adjusts the frequency of the zero of the compensator gain function and/or the mid-frequency gain of the compensator gain function, in order that the number of poles of the system open loop gain function is at most more than the number of zeroes of the system open loop gain function by one under the crossover frequency.

28. The secondary side control circuit of claim 24, wherein the load determination circuit determines whether the load circuit is in a light load condition or a heavy load condition according to the load current, and when the load circuit is determined to be in the heavy load condition, the variable RC circuit adjusts the frequency of the zero of the compensator gain function to cancel the pole of an uncompensated system loop gain function corresponding to a target heavy load condition; when the load circuit is determined to be in the light load condition, the variable RC circuit adjusts the frequency of the zero of the compensator gain function and/or the mid-frequency gain of the compensator gain function, in order that the number of poles of the system open loop gain function is at most more than the number of zeroes of the system open loop gain function by one under the crossover frequency.

* * * * *